United States Patent [19]

Loree

[11] Patent Number: 5,515,923
[45] Date of Patent: May 14, 1996

[54] OIL AND GAS WELL PRODUCTIVITY

[76] Inventor: Dwight N. Loree, 758 Woodpark Road SW., Calgary, Alberta, Canada, T2X 2S4

[21] Appl. No.: 379,321

[22] Filed: Jan. 25, 1995

Related U.S. Application Data

[63] Continuation-in-part of Ser. No. 307,901, Sep. 16, 1994.
[51] Int. Cl.$^6$ .......................... E21B 43/26; E21B 43/267
[52] U.S. Cl. ........................................ 166/308; 166/305.1
[58] Field of Search ................................ 166/308, 305.1, 166/250, 268, 275, 274

[56] References Cited

U.S. PATENT DOCUMENTS

| | | | |
|---|---|---|---|
| 3,368,627 | 2/1968 | Hurst et al. | 166/42 |
| 3,601,198 | 8/1971 | Ahearn et al. | 166/308 |
| 3,664,422 | 5/1972 | Bullen | 166/308 X |
| 3,842,910 | 10/1974 | Zingg et al. | 166/305 |
| 3,913,672 | 10/1975 | Allen et al. | 166/263 |
| 4,519,455 | 5/1985 | Holtmayer et al. | 166/305 |
| 4,617,993 | 10/1986 | Brown | 166/305.1 X |
| 4,701,270 | 10/1987 | Bullen et al. | 252/8.551 |
| 4,825,952 | 5/1989 | Mzik | 166/308 |

FOREIGN PATENT DOCUMENTS

| | | | |
|---|---|---|---|
| 1134258 | 10/1982 | Canada | 166/21 |
| 1268325 | 5/1990 | Canada | 31/14 |

OTHER PUBLICATIONS

Hassen, B. R., et al., "Improving Oilwell Stimulations with Compatible Oils," *Journal of Canadian Petroleum Technology*, at least as early as 1990.

Dresser–Titan, "CO2 Engineering", T300, Brochure.

*Primary Examiner*—Stephen J. Novosad
*Attorney, Agent, or Firm*—Christensen, O'Connor, Johnson & Kindness

[57] ABSTRACT

A method of improving oil or gas well productivity from a well penetrating a formation in an oil or gas reservoir, by injecting a stream of liquified drive fluid into the well ahead of a load fluid to establish a miscible bank of drive fluid in the well. While injecting the stream of liquified drive fluid into the well, a load fluid in which the liquified drive fluid is miscible is injected into the well mixed with the liquified drive fluid. The ratio of liquified drive fluid to load fluid is initially at a level sufficient to form a miscible bank of drive fluid in the gaseous state ahead of the load fluid in the well. Subsequently, the ratio of liquified drive fluid to load fluid injected into the well is reduced.

14 Claims, 3 Drawing Sheets

OIL AND GAS WELL PRODUCTIVITY

The present application is a continuation-in-part of U.S. application Ser. No. 08/307,901, filed Sep. 16, 1994, the benefit of which filing date is claimed under 35 U.S.C. §120.

FIELD OF THE INVENTION

This invention relates to methods of oil and gas well treatment.

BACKGROUND OF THE INVENTION

Oil and gas well treatments are notorious for unexpected results. What may increase production in one well may shut off another well. Yet a successful well treatment can significantly increase production of a well and extend its production life, with rapid economic payback of the cost of the well treatment. Significant research is therefore devoted to improving well treatments.

One such common well treatment is the fracturing of a well formation using various load fluids and proppants to increase formation permeability, commonly known as a frac. Pressure on load fluid in the well causes cracks to form in the formation and proppants (sand, for example) injected into the well with the load fluids become wedged in the cracks, thus keeping the cracks open and increasing permeability. Various load fluids are used for fracturing, including oils, water, methanol and other alcohols, carbon dioxide, explosives, and acids.

In Canadian patent no. 1,268,325 of Mzik there is described a method of treating a well formation penetrated by a wellbore which comprises injecting down the wellbore and into the formation a fluid mixture comprising a mixture of carbon dioxide and a hydrocarbon fluid containing aromatics at a pressure sufficient to cause fracturing of the formation.

It has been found that fracturing a well with a mixture of carbon dioxide and hydrocarbon fluid containing aromatics yields variable recovery of load fluid in the general case, and thus an uncertain economic return from the use of the method. Low recovery of load fluid may cause a reduction in permeability of the formation, with consequent decline in production from the well. Hence, the economic efficiency of application of the method of Mzik to an oil or gas well is somewhat uncertain, and may in fact be deleterious to the well productivity. Yet the use of carbon dioxide and a hydrocarbon fluid containing aromatics may provide significant economic benefits as shown by the example in the patent of Mzik.

SUMMARY OF THE INVENTION

The inventor has investigated the treatment of oil and gas reservoirs with load fluids including hydrocarbons and carbon dioxide. During a frac with such a load fluid, the carbon dioxide drives the load fluid into the formation containing oil and gas under frac pressure. Upon release of the frac pressure, the reservoir pressure drives the load fluid back out of the well.

In most wells the reservoir drive pressure is caused by methane in the reservoir. The inventor has found that methane is not miscible in a hydrocarbon based load fluid that contains carbon dioxide that is totally miscible in the load fluid. Hence, the methane tends to finger into such a load fluid, and thus fails to drive a portion, perhaps a substantial portion, of the load fluid out of the reservoir. This loss of load fluid may decrease permeability of the well, hence decrease production form the well.

The inventor has found that when carbon dioxide forms a bank in front of the load fluid, the methane mixes with the carbon dioxide, and does not finger into the load fluid. Thus, upon release of the fracturing pressure, the methane drives a mixture of $CO_2$ and methane which in turn drives the load fluid back out of the well.

The inventor has previously proposed a method of improving oil or gas well productivity from a well penetrating a formation in an oil or gas reservoir, in which the steps include:

forming a hydrocarbon based load fluid with an amount of carbon dioxide determined according to a predetermined miscibility relationship between the carbon dioxide and the hydrocarbon fluid that establishes the amount of carbon dioxide required to form a bank of carbon dioxide ahead of the load fluid in the formation;

applying the load fluid to the well at a pressure such that carbon dioxide in load fluid within the well bore remains in solution and carbon dioxide in load fluid within the formation leaks off the load fluid into the formation and forms a bank of carbon dioxide ahead of the load fluid; and releasing the surface pressure from the load fluid and flowing the load fluid back out of the well. Preferably, the load fluid contains a significant proportion of aromatics.

In the present invention, a miscible bank is created ahead of the load fluid by:

injecting a stream of liquified drive fluid into the well;

while injecting the stream of liquified drive fluid into the well, injecting a load fluid in which the liquified drive fluid is miscible into the well mixed with the liquified drive fluid;

the ratio of liquified drive fluid to load fluid being initially at a level sufficient to form a miscible bank of drive fluid in the gaseous state ahead of the load fluid in the well; and subsequently reducing the ratio of liquified drive fluid to load fluid injected into the well.

In one aspect of the invention, a pad of pure liquified drive fluid is initially injected into the well, and in another the initially injected fluid contains a greater proportion by volume of liquified drive fluid than hydrocarbon based load fluid. The drive fluid is preferably liquified carbon dioxide and the load fluid is preferably selected from the group comprising aromatics, alkanes and naphthenes.

BRIEF DESCRIPTION OF THE DRAWINGS

There will now be described preferred embodiments of the invention, with reference to the drawings, by way of illustration, in which.

DETAILED DESCRIPTION OF PREFERRED EMBODIMENTS

The method of the invention is carried out as follows. For a given well treatment, where the well penetrates a formation in an oil or gas reservoir, the pressure and temperature of the well is found from information from the well operator. As used in this patent document, a load fluid is a formation compatible fluid having a viscosity such that it can transport proppants during a frac treatment of a well. A drive fluid is a fluid that has the property that when pressure is reduced on the fluid in the well, the drive fluid expands and with the assistance of formation pressure can drive a load fluid from a well. The drive fluid must be miscible in the load fluid and formation gas, such as methane.

In treating a well according to the within invention, firstly, using equipment that is known in the art, a stream of liquified drive fluid is injected into the well, and while this occurs, a load fluid is injected into the well mixed with the liquified drive fluid. The drive and load fluids can be pumped from separate tanks using separate pumpers and mixed at a pipe junction before proceeding down a single pipe through a tree saver into the well.

Figure 1:
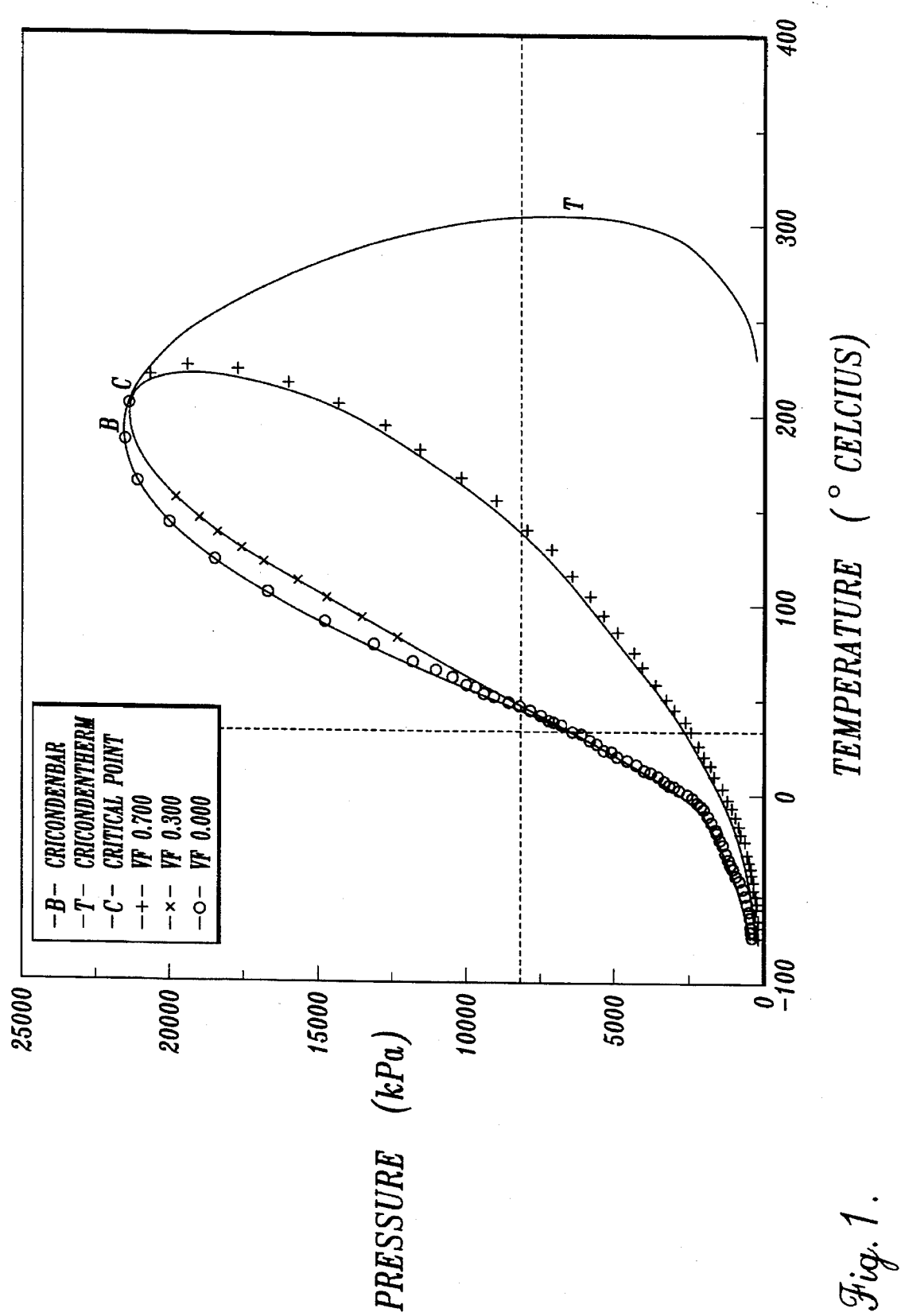
FIG. 1 is a graph showing a phase envelope for a mixture of hydrocarbon frac fluid and carbon dioxide.

The ratio of liquified drive fluid to load fluid should initially be at a level sufficient to form a miscible bank of drive fluid in the gaseous state ahead of the load fluid in the well. This amount may be determined from the graphs in FIGS. 1, 2 and 4 for various load fluids and carbon dioxide. Next, the ratio of liquified drive fluid to load fluid injected into the well is reduced. With the greater volume of load fluid in this stage of the treatment, more sand can be displaced into fractures created by frac pressure on the mixture of load fluid and drive fluid.

In a first stage of treatment of the well, the volume of liquified drive fluid injected into the well may be initially greater than the volume of load fluid injected into the well, for example the initial drive fluid may be essentially pure, thus forming a pad of drive fluid ahead of the load fluid.

In a second stage of treatment of the well, after the greater volume of liquified drive fluid is injected into the well, a mixture of liquified drive fluid and load fluid is injected into the well with the volume of liquified drive fluid being less than the volume of load fluid in the mixture.

The drive fluid is preferably liquified carbon dioxide and the load fluid is preferably composed of aromatics, alkanes and naphthenes. It is believed that linear alpha-olefin monomers may also be used. Fracturing pressures are preferably applied after the pad of drive fluid is injected into the well, namely during the second stage of the treatment only.

The load fluid is preferably a light petroleum distillate, the preferred cut is about 100° C. and greater. A good example is frac fluid known as FRACSOL™ fluid, derived from the Sundre C5+ condensate available from Trysol Canada Limited of Calgary, Alberta, Canada distilled to 110° C. It includes the following constituents (with volume fraction in parentheses as determined by gas chromatography): heptanes (0.0072), octanes (0.1191), nonanes (0.1028), decanes (0.1143), undecanes (0.0927), dodecanes (0.0687), tridecanes (0.0598), tetradecanes (0.0449), pentadecanes (0.0366) and smaller quantities of $C_{16}+$ alkanes, as well as smaller quantities of toluene (0.0131), benzene and xylene (ethylbenzene, p+m-xylene 0.0371, o-xylene 0.0156, 1,2,4 trimethylbenzene 0.0158). However, actual aromatic content is believed to be about 35% (the gas chromatography does not distinguish between some aromatics and alkanes). The following products of Dome Petroleum Limited of Calgary, Alberta, may also be used: FRAC OIL 120, FRAC OIL 200, FRAC OIL 300, FRAC and OIL 500, as well as SUPER FRAC™ made by Home Oil Company Limited of Calgary, Alberta. A product with increased xylene, for example XYSOL fluid available from Trysol Canada Ltd., may also be useful with actual aromatic content at about 70% or greater.

Figure 2:
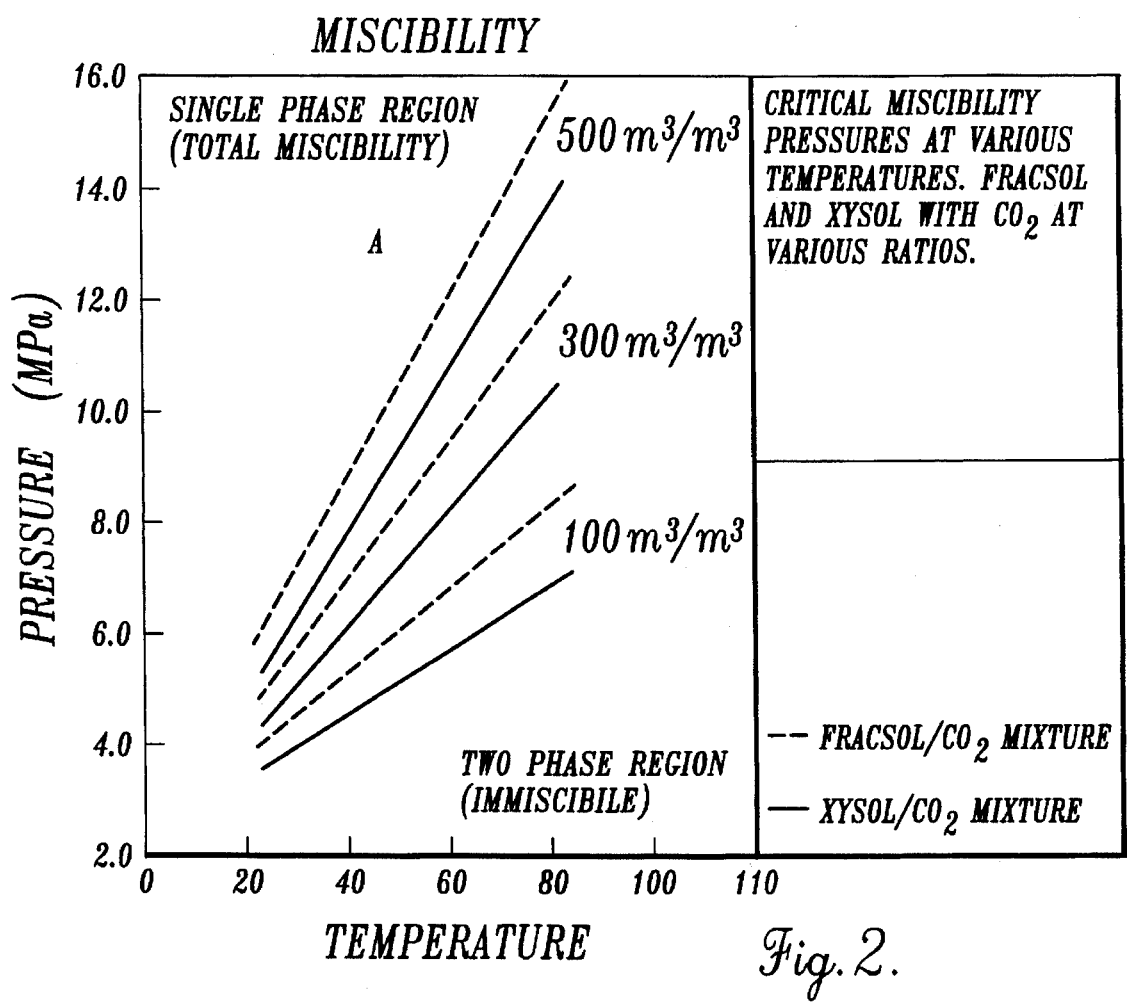
FIG. 2 is a graph showing the miscibility relationship of carbon dioxide at various pressures and temperatures for two fluids containing different amounts of aromatics.

In FIG. 2 is shown the miscibility relationship for FRACSOL fluid and XYSOL fluid. The miscibility relationship establishes the amount of carbon dioxide required to form a bank of carbon dioxide ahead of the load fluid in the formation. At the frac pressure, the carbon dioxide should be totally miscible in the hydrocarbon fluid (area A in FIGS. 1 and 2). At a pressure between the frac pressure and the formation pressure, the carbon dioxide should come out of solution to form the bank ahead of the load fluid. It is preferred that the bank occupy between 10% and 100% of the pore volume of the reservoir, with the higher rates (near 100%) preferred. Thus, if the amount of carbon dioxide that would be miscible in the load fluid is about 300 $m^3/m^3$ at the formation pressure and temperature, then an amount of carbon dioxide about 500 $m^3/m^3$ should be added to the hydrocarbon fluid. In the formation, the load fluid in cracks in the formation and in the well bore will have pressure equal to the static pressure plus added pressure due to frac pressure. With increasing distance within the formation from the cracks communicating with the well bore, the pressure gradually decreases to the formation pressure. It is believed essential that the amount of carbon dioxide in the load fluid should be sufficient that some portion of the carbon dioxide comes out of solution within the area where the pressure gradually reduces to formation pressure. This may occur in the well bore as well.

Figure 4:
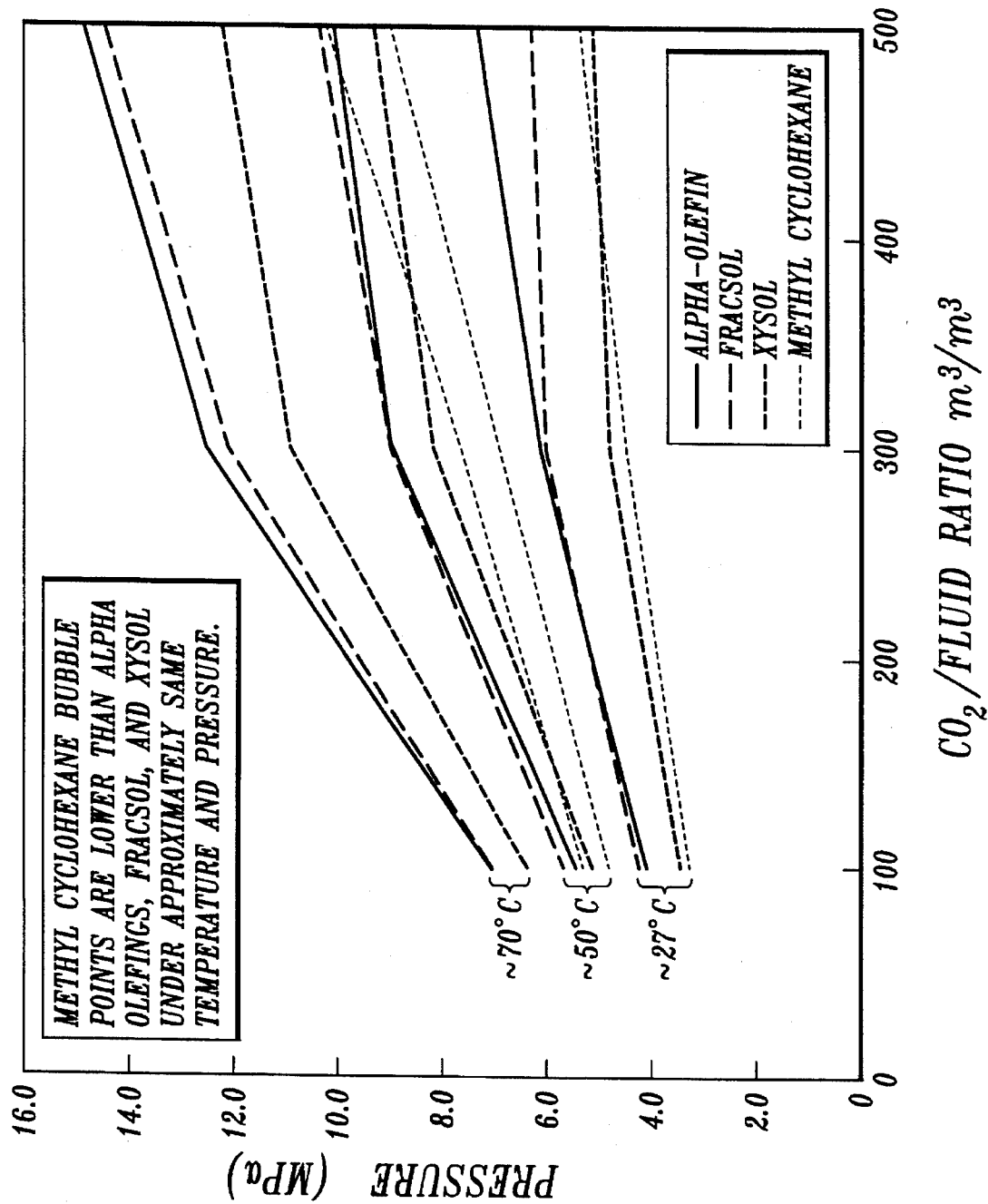
FIG. 4 is a graph showing miscibility relationships of liquified carbon dioxide with alpha-olefin (tetradecene), methylcyclohexane, FRACSOL™ and XYSOL™, a xylene rich mixture of liquid alkanes and aromatics.

FIG. 4 shows bubble sensitivity curves for several load fluids including XYSOL™, FRACSOL™, methylcyclohexane (a representative naphthene) and tetradecene. For constant ratio drive fluid to load fluid, each line divides, for a given temperature, pressures at which the mixture of drive fluid and load fluid are in single phase (above the line) and two phase (below the line). In reducing pressure during a frac, the fluid in the formation and in the well bore near the formation crosses the line and moves from single phase to two phase. The line for methylcyclohexane shows that a load fluid with a large proportion of naphthenes, such as more than 50% by volume, will be particularly useful for shallow wells.

Figure 3:
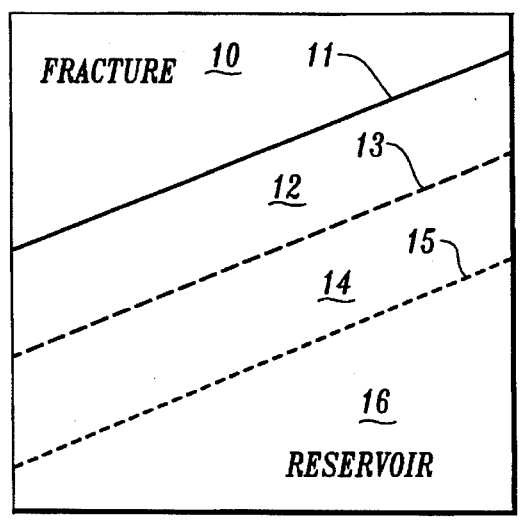
FIG. 3 is a section through a hypothetical reservoir and fracture zone showing fluid distribution zones during a well treatment according to the invention.

FIG. 3 shows a section from a reservoir identifying a fracture zone 10, and reservoir 16, with intermediate zones 12 and 14. From the far field reservoir with no carbon dioxide and high concentration of methane (being entirely reservoir gas) at zone 16, the reservoir composition graduates from pure methane at boundary 15 to part methane part carbon dioxide in zone 14, and then to pure carbon dioxide approximately at 13. This is a first miscible bank. A second miscible bank starts with the pure carbon dioxide and gradually becomes denser through zone 12 as the concentration of the hydrocarbon liquid base fluid increases until it reaches 75–80% base liquid and 20–25% carbon dioxide that remains in the fracture and the well bore beginning at the fracture boundary 11.

During pressurizing of the load fluid and drive fluid, carbon dioxide in load fluid within most of the well bore remains in solution and carbon dioxide in load fluid within and near the formation leaks off the load fluid into the formation and forms a bank of carbon dioxide ahead of the load fluid in the formation and in the well bore. If the amount of carbon dioxide is selected as described above, then this will occur when fracturing pressure is applied to the well.

Next, surface pressure is released from the load fluid and the load fluid flows back out of the well. For flow back, the amount of carbon dioxide is reduced to an amount of carbon dioxide that is effectively totally in solution at the formation pressure. For the example described above this would be about 300 m$^3$/m$^3$. The pressure during flow back should not be released too quickly, otherwise the methane may drive into and finger into the load fluid, which may lead to an undesirable amount of load fluid remaining in the pores of the formation.

For wells with very high pressure, for example 16 MPa, a large amount of carbon dioxide is required for load fluids with a moderate amount (35% of aromatics). Thus, it is desirable to select a load fluid having a lower proportion of aromatics, as for example 10%–20%, for higher pressure wells. The load fluid aromatic content is thus selected according to the pressure of the well formation. For wells with low pressure, a load fluid with larger amounts of aromatics is desired, such as XYSOL fluid, since more carbon dioxide can be added in solution to load fluids with larger amounts of aromatics.

For some wells, it may be desirable to use the same or a similar fluid at lower than fracturing pressures, but the same technique is still used to ensure complete flowback of the load fluid.

EXAMPLE 1

The Dunvegan formation in the Waskahigan area of northwestern Alberta, is typically low in liquid saturation. In the past, many types of frac fluids have been used on this formation. The well Amoco Waskahigan 15-12 for example had been fractured with an emulsified mixture of aqueous and hydrocarbon bases. This mixture was not miscible with the reservoir gases. Production tests indicated the well was capable of about 10(10$^3$)m$^3$/day.

The formation static pressure is approximately 8,500 kPa and temperature is 50 degrees C. The well was cased with 177.8 mm casing down to a formation depth of ca. 1450 m. Formation permeability was 1.6 md average, porosity was about 11% and water saturation was 30%.

Evaluation of the miscibility data showed that at this temperature and pressure 350 m$^3$/m$^3$ (35% by volume) of $CO_2$ is miscible in FRACSOL fluid (see FIG. 2). The fracture treatment was executed with a pad volume of 20 m$^3$ of Fracsol hydrocarbon aromatic fracturing fluid and $CO_2$ mixture. The $CO_2$ was mixed at 550 m$^3$/m$^3$ (50% by volume). Fracturing pressures at surface were 20,000 kPa and 24,600 kPa in the formation. All the $CO_2$ remains in solution in the surface lines, bottom of the hole and in the fracture as the pressure remains above 11,000 kPa where the gas starts to evolve (see FIG. 2). However, as the fluid leaks off, the pressure gradually drops below 11,000 kPa and $CO_2$ comes out of solution until at the reservoir pressure of 8,500 kPa only 350 m$^3$/m$^3$ of $CO_2$ remains in solution. This evolved $CO_2$ forms a miscible bank between the reservoir gas methane and the fracturing fluid $CO_2$ mixture.

The remainder of the fracture treatment consisted of FRACSOL hydrocarbon aromatic fracturing fluid and $CO_2$ mixture. The $CO_2$ was mixed at the lower concentration of 350 m$^3$/m$^3$ (35% by volume) necessary for flow back.

After the treatment, 70% of the treating fluid was recovered. This is considered a high percentage recovery. Productivity increased to 38 (10$^3$)m$^3$/day.

The load fluid should be formation compatible, as would be understood by a person skilled in the art. For example, it should not precipitate waxes or asphaltenes to any great extent, which can be determined experimentally before application of the fluid. The carbon dioxide forms a drive fluid, which in the generalized invention is miscible in the load fluid and in which the reservoir gas is miscible at well treatment pressures and temperatures (for example during fracturing, but also during lower pressure treatments as for example squeezing).

HYPOTHETICAL EXAMPLE

In a proposed frac process, to be applied to a Rock Creek (Pembina, Alberta) reservoir, the bottom hole pressure is 17900 KPa and the bottom hole temperature is 70° C., up to 820 m$^3$/m$^3$ of $CO_2$ is miscible in FRACSOL™. To establish the miscible bank, it is recommended in this instance that the hole fill is straight $CO_2$, with the remainder of the frac being at concentrations of 250 m$^3$/m$^3$ (31.5% by volume) of liquid $CO_2$ (with 68.5% FRACSOL™ fluid). For the frac job, up to 61 m$^3$ of FRACSOL™ may be required. Two frac pumpers, a frac blender, one $CO_2$ pumper and one $CO_2$ trailer with 17,000 m$^3$ $CO_2$ are used, and 30 tonnes of 20/40 mesh sand. Firstly, the hole is filled with $CO_2$ without applying frac pressures. Then 22 m$^3$ $CO_2$ mixed with FRACSOL™ (31.5% $CO_2$ and 68.5% FRACSOL™ by volume) is injected at maximum rates down the well tubing. Next 30 tonnes of the sand is mixed with the drive fluid/load fluid mixture and frac pressures applied. Finally, the well is flushed with 6.9 m$^3$ of the same mixture without sand.

A person skilled in the art could make immaterial modifications to the invention described and claimed in this patent without departing from the essence of the invention.

The embodiments of the invention in which an exclusive property or privilege is claimed are defined as follows:

1. A method of improving oil or gas well productivity from a well penetrating a formation in an oil or gas reservoir, the method comprising the steps of:

injecting a stream of liquified drive fluid into the well;

while injecting the stream of liquified drive fluid into the well, injecting a load fluid in which the liquified drive fluid is miscible into the well mixed with the liquified drive fluid;

the ratio of liquified drive fluid to load fluid being initially at a level sufficient to form a miscible bank of drive fluid in the gaseous state ahead of the load fluid in the well; and subsequently reducing the ratio of liquified drive fluid to load fluid injected into the well.

2. The method of claim 1 in which, in a first stage of treatment of the well, the volume of liquified drive fluid injected into the well is initially greater than the volume of load fluid injected into the well.

3. The method of claim 2 in which, in a second stage of treatment of the well, after the greater volume of liquified drive fluid is injected into the well, a mixture of liquified drive fluid and load fluid is injected into the well with the volume of liquified drive fluid being less than the volume of load fluid in the mixture.

4. The method of claim 1 in which, in a first stage of treatment of the well, an essentially pure liquified drive fluid is initially injected into the well to form a pad of liquified drive fluid in the well.

5. The method of claim 4 in which, in a second stage of treatment of the well, after the pad of liquified drive fluid is injected into the well, a mixture of liquified drive fluid and load fluid is injected into the well with the volume of liquified drive fluid being less than the volume of load fluid in the mixture.

6. The method of claim 1 in which fracturing pressures are applied to the liquified drive fluid and load fluid injected into the well.

7. The method of claim 3 in which fracturing pressures are applied to the liquified drive fluid and load fluid injected into the well during the second stage of treatment of the well and not during the first stage.

8. The method of claim 5 in which fracturing pressures are applied to the liquified drive fluid and load fluid injected into the well during the second stage of treatment of the well and not during the first stage.

9. The method of claim 1, 2 or 3 in which the liquified drive fluid is liquid carbon dioxide.

10. The method of claim 4 or 5 in which the liquified drive fluid is liquid carbon dioxide.

11. The method of claim 6, 7 or 8 in which the liquified drive fluid is liquid carbon dioxide.

12. The method of claim 1, 2 or 3 in which the liquified drive fluid is liquid carbon dioxide and the load fluid is a hydrocarbon based load fluid selected from the group comprising aromatics, alkanes and naphthenes.

13. The method of claim 4 or 5 in which the liquified drive fluid is liquid carbon dioxide and the load fluid is a hydrocarbon based load fluid selected from the group comprising aromatics, alkanes and naphthenes.

14. The method of claim 6, 7 or 8 in which the liquified drive fluid is liquid carbon dioxide and the load fluid is a hydrocarbon based load fluid selected from the group comprising aromatics, alkanes and naphthenes.

* * * * *

UNITED STATES PATENT AND TRADEMARK OFFICE
CERTIFICATE OF CORRECTION

PATENT NO. : 5,515,923
DATED : May 14, 1996
INVENTOR(S) : D.N. Loree

It is certified that error appears in the above-indentified patent and that said Letters Patent is hereby corrected as shown below:

On the title page

[54] Title     Before "OIL AND GAS WELL PRODUCTIVITY" insert
Pg. 1, col. 1     --METHOD OF IMPROVING--

[56] Refs. Cited     "Holtmayer et al." should read --Holtmyer et al.--
Pg. 1, col. 1 (U.S. Pats.)

Signed and Sealed this

Twenty-second Day of October, 1996

Attest:

BRUCE LEHMAN

Attesting Officer     *Commissioner of Patents and Trademarks*